US011684946B2

United States Patent
Zhou et al.

(10) Patent No.: US 11,684,946 B2
(45) Date of Patent: Jun. 27, 2023

(54) GLUE APPLICATION DEVICE FOR PRODUCING BATTERY

(71) Applicant: CONTEMPORARY AMPEREX TECHNOLOGY CO., LIMITED, Ningde (CN)

(72) Inventors: Xinyu Zhou, Ningde (CN); Huayong Xu, Ningde (CN); Xiandong Du, Ningde (CN); Rui Zhang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 338 days.

(21) Appl. No.: 17/135,480

(22) Filed: Dec. 28, 2020

(65) Prior Publication Data

US 2021/0114056 A1 Apr. 22, 2021

Related U.S. Application Data

(63) Continuation of application No. PCT/CN2019/105687, filed on Sep. 12, 2019.

(30) Foreign Application Priority Data

Sep. 13, 2018 (CN) .......................... 201821501274.9

(51) Int. Cl.
*B05C 11/10* (2006.01)
*H01M 10/04* (2006.01)
*B05C 13/02* (2006.01)

(52) U.S. Cl.
CPC .......... *B05C 11/1018* (2013.01); *B05C 11/10* (2013.01); *H01M 10/0404* (2013.01); *B05C 13/02* (2013.01)

(58) Field of Classification Search
CPC ............ B05C 11/1005; B05C 11/1018; B05C 11/1021; B05C 11/10; B05C 13/02; H01M 10/0404; Y02P 70/50

(Continued)

(56) References Cited

U.S. PATENT DOCUMENTS 5,878,957 A * 3/1999 Takado ................. B05B 12/085
239/71
2002/0071772 A1 6/2002 Isogai et al.

FOREIGN PATENT DOCUMENTS

CN 201781003 U 3/2011
CN 204247471 U 4/2015
(Continued)

OTHER PUBLICATIONS

JP05345160, Onuma, Adhesive Coating Apparatus, published Dec. 27, 1993. (Year: 1993).*

(Continued)

*Primary Examiner* — Laura Edwards
(74) *Attorney, Agent, or Firm* — Morgan, Lewis & Bockius LLP

(57) ABSTRACT

The present application relates to the technical field of glue application and in particular, to an apparatus for producing a battery module. The apparatus comprises a frame, a glue application device, a module height measuring device and a glue amount control device. The glue application device is installed on the frame. The module height measuring device is used for measuring height differences between a plurality of battery cells in the battery module. The glue amount control device is coupled to both the module height measuring device and the glue application device. The glue amount control device is arranged to control the amount of glue applied by the glue application device to the plurality (Continued)

of battery cells according to the height differences determined by the module height measuring device.

8 Claims, 3 Drawing Sheets

(58) Field of Classification Search
 USPC .......................................................... 118/712
 See application file for complete search history.

(56) References Cited

FOREIGN PATENT DOCUMENTS

| CN | 104668149 A | 6/2015 |
|----|----|----|
| CN | 205570695 U | 9/2016 |
| CN | 106824678 A | 6/2017 |
| CN | 107046147 A | 8/2017 |
| CN | 107597516 A | 1/2018 |
| CN | 108543674 A | 9/2018 |
| CN | 208824903 U | 5/2019 |
| DE | 102012016170 A1 | 2/2014 |
| DE | 102012016170 B4 | 10/2017 |
| JP | 2008055337 A | 3/2008 |

OTHER PUBLICATIONS

English Machine Translation of JP05345160, Onuma, Adhesive Coating Apparatus, published Dec. 27, 1993. (Year: 1993).*
Contemporary Amperex Technology Co., Limited, Extended European Search Report, EP19861062.8, dated Jul. 5, 2021, 6 pgs.
Contemporary Amperex Technology Co., Limited, Communication Under Rule 71(3) EPC, EP19861062.8, dated Sep. 16, 2022, 22 pgs.
Contemporary Amperex Technology Co., Limited, International Search Report and Written Opinion, PCTCN2019105687, dated Dec. 11, 2019, 17 pgs.

* cited by examiner

US 11,684,946 B2

GLUE APPLICATION DEVICE FOR PRODUCING BATTERY

CROSS-REFERENCE TO RELATED APPLICATIONS

This application is a continuation application of PCT Patent Application No. PCT/CN2019/105687, entitled "GLUING DEVICE FOR BATTERY PRODUCTION" filed on Sep. 12, 2019, which claims priority to Chinese Patent Application No. 201821501274.9, filed with the State Intellectual Property Office of the People's Republic of China on Sep. 13, 2018, and entitled "GLUE APPLICATION DEVICE FOR PRODUCING BATTERY", all of which are incorporated herein by reference in their entirety.

TECHNICAL FIELD

The present application relates to the technical field of glue application and in particular, to a glue application apparatus for producing a battery module.

BACKGROUND

During the production process of a battery module, a plurality of battery cells in the battery module need to be glued with the housing which at one hand improves the safety of the entire battery module, and on the other hand further improves the heat dissipation efficiency of the battery module. At present, when the battery module is assembled, a structural glue with good bonding effect is typically used to connect a plurality of battery cells as well as two end plates first, and then an insulation test and tests regarding such parameters as power and voltage are performed to the semi-finished battery module. In the process of connecting the plurality of battery cells with the structural glue, it is desirable to provide fixed connection based on the upper surface of the pole of the cells, which facilitates testing and the subsequent welding process of connecting plates of cells, and also ensures the safety of the battery module. However, as there are dimensional tolerances among different cells in the height direction of cells, bonded cells of different sizes may have unaligned bottoms. Currently, the amount of glue applied between the cells and the bottom plate is a fixed value. This may result in insufficient bonding and reducing heat dissipation efficiency provided by the glue due to insufficient glue in certain areas on the bottom plate, and also overflowing of the glue due to excessive glue in some areas on the bottom plate, which is adverse to the improvement of the quality of the entire battery module.

SUMMARY

An objective of the present application is to provide a glue application apparatus to solve the problem mentioned above when conventional glue application apparatus cannot change the amount of glue applied on the bottom of each cell according to the actual size of the cell.

The present application provides an apparatus for producing a battery module, comprising:
  a frame;
  a glue application device installed on the frame;
  a module height measuring device, used for measuring height differences between a plurality of battery cells in a battery module;
  a glue amount control device, coupled to both the module height measuring device and the glue application device, and arranged to control an amount of glue applied by the glue application device to the plurality of battery cells respectively according to the height differences provided by the module height measuring device.

In some embodiments, the module height measuring device comprises an enclosure support platform and multiple height measuring units. The enclosure support platform is used for supporting an enclosure of the battery module. The height measuring units are arranged to measure distances from bottom surfaces of the plurality of battery cells to the enclosure support platform respectively.

In some embodiments, the module height measuring device further comprises a digital-to-analog conversion unit. The height measuring units have a plurality of elastic height measuring probes that are all connected to the digital-to-analog conversion unit. The digital-to-analog conversion unit is communicated with the glue amount control device.

In some embodiments, the plurality of the height measuring units are evenly and linearly arranged.

In some embodiments, the plurality of the height measuring units are arranged at a middle position of the enclosure support platform to measure a height from a middle part on the bottom of the cell to the enclosure support platform.

In some embodiments, the module height measuring device further comprises a plurality of pressing units installed on the enclosure support platform, and arranged to press the battery module downwards.

In some embodiments, the plurality of pressing units are arranged around the height measuring units.

In some embodiments, the module height measuring device further comprises a limiting block, which is installed on the enclosure support platform to be engaged and fitted with the battery module.

In some embodiments, the apparatus provided by the present application further comprises a movable mount, through which the glue application device is installed on the frame.

In some embodiments, the apparatus provided by the present application further comprises a feeding manipulator arranged on one side of the frame.

The present application has the following beneficial effects: in the apparatus provided by the present application, the glue application device installed on the frame is used to apply glue to cells. The module height measuring device can measure the height differences between a plurality of battery cells in the battery module, and output the measurement results to the glue amount control device. The glue amount control device may accordingly control the amount of glue applied during the application of glue to individual cells by the glue application device based on the height differences described above, so that insufficient glue or excessive glue can be avoided when the plurality of battery cells are fitted with the bottom plate, thereby improving the overall quality of the battery module.

It should be understood that the above general description and the following detailed description are exemplary and are not intended to limit the present application.

Figure 1:
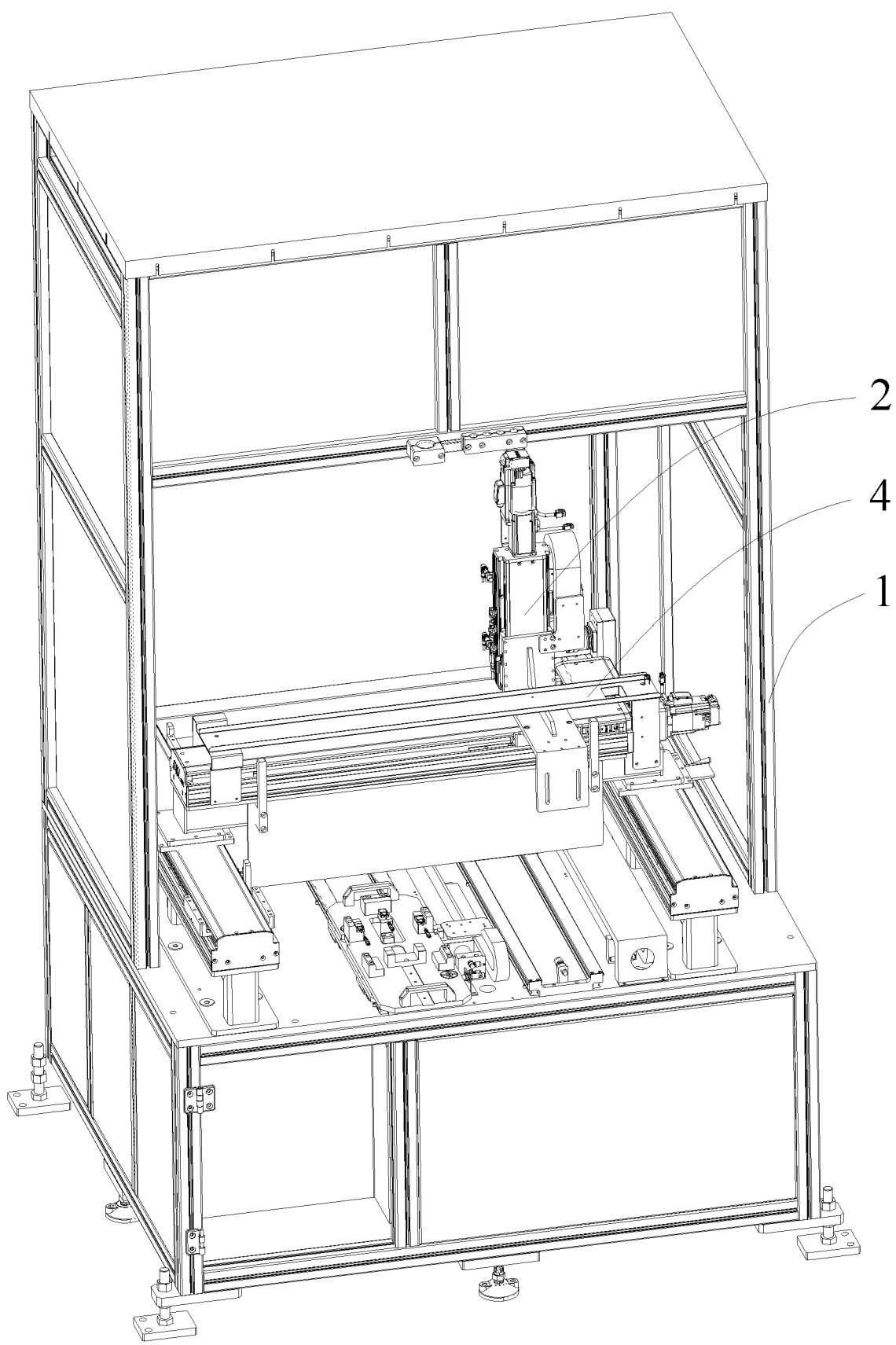
FIG. 1 is a partially structural schematic diagram of an apparatus provided by an embodiment of the present application.

The accompanying drawings herein, which are incorporated into the specification and constitute a part of the specification, illustrate the embodiments in accordance with the present application and are used to explain the principles of the present application together with the specification.

DETAILED DESCRIPTION

The present application is described in further detail below through specific embodiments and with reference to the accompanying drawings.

In the description of the present application, unless otherwise clearly specified or defined, terms "first", "second", "third" and "fourth" are used only for the purpose of description, and do not indicate or imply relative importance. The term "a plurality of" means two or more. The terms such as "connection" and "fixation" should be comprehended in a broad sense. For example, "connection" may be fixed connection, or removable connection, or integral connection, or electrical connection. The connection may be direct connection, or indirect connection through an intermediate medium. Those of ordinary skill in the art may understand the specific meanings of the foregoing terms in the present application based on the specific context.

It should be understood that in the description of this specification, the directional terms such as "above", "below", "left" and "right" described in embodiments of the present application are described as shown in the drawings, and should not be construed as a limitation to embodiments of the present application. In addition, it should also be understood that in this context, when an element is referred as connected "above" or "below" another element, the element can not only be directly connected "above" or "below" another element, but can also be indirectly connected "above" or "below" another element through an intermediate element.

Figure 2:
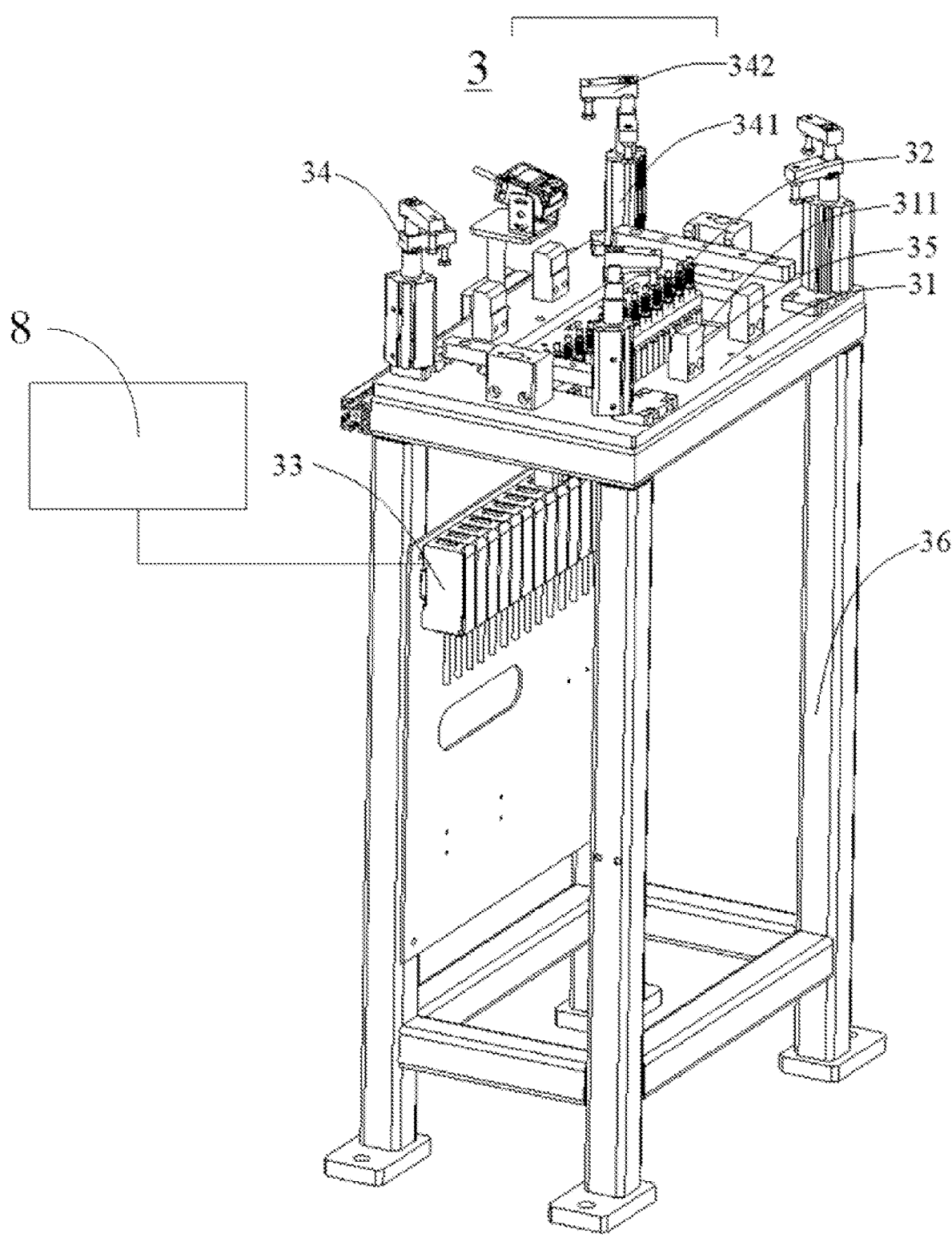
FIG. 2 is a structural schematic diagram of a module height measuring device in the apparatus provided by the embodiment of the present application.
Figure 3:
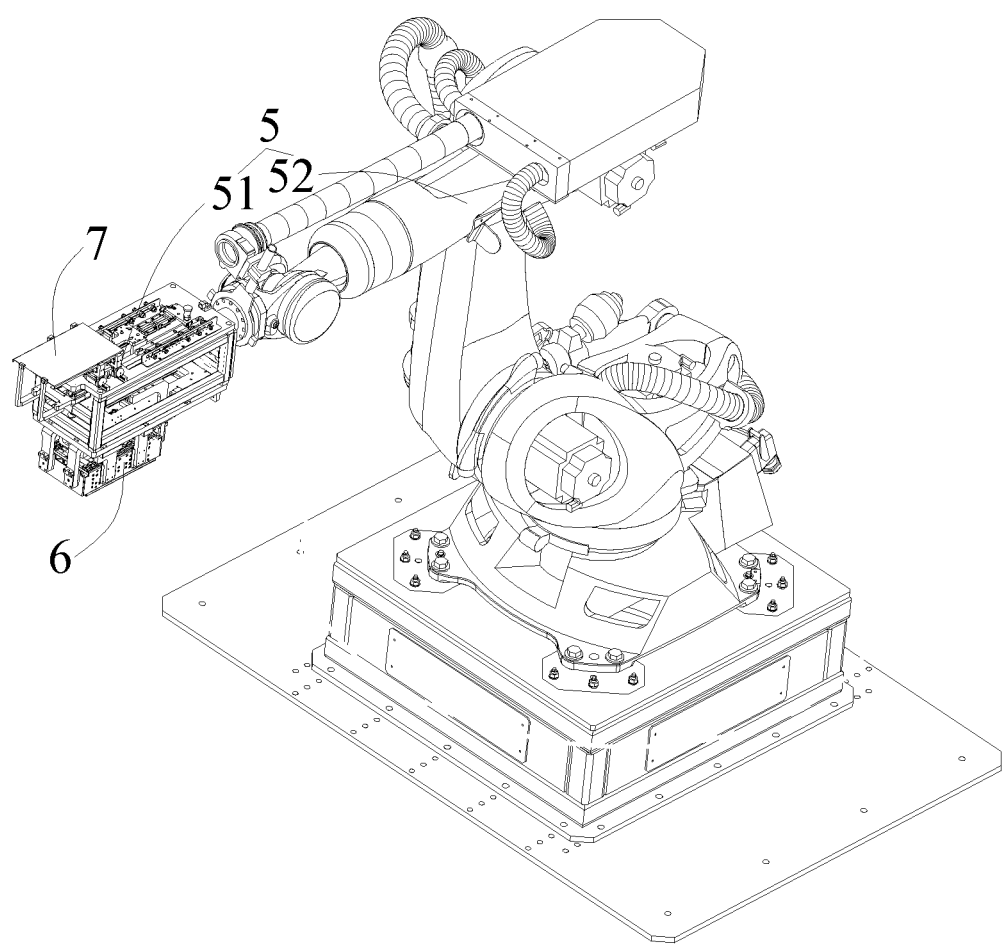
FIG. 3 is a structural schematic diagram of a feeding manipulator in the apparatus provided by the embodiment of the present application.

As shown in FIGS. 1-3, an embodiment of the present application provides an apparatus. The apparatus flexibly changes the amount of glue applied on a bottom of a battery module 6 according to the actual size of each cell in the battery module 6 when the battery module 6 is assembled, so that insufficient glue or excessive glue is avoided when the plurality of battery cells are fitted with a bottom plate 7, thereby improving the overall quality of the battery module 6. The apparatus comprises a frame 1, a glue application device 2, a module height measuring device 3 and a glue amount control device 8. The glue application device 2 is used to squeeze and apply glue onto a component to be glued, and may be installed on the frame 1 through a connecting member. The module height measuring device 3 is used to measure height differences between a plurality of battery cells in the battery module. It should be noted that in order to facilitate the measurement work, the battery module 6 to be measured may comprise an enclosure and a plurality of battery cells, and is not be connected to the bottom plate 7. The enclosure may comprise a side plate and an end plate, which may be fixedly connected by means of welding to form the enclosure. A structural glue may be used to fixedly connect a plurality of battery cells, and the cells to the end plate in advance. In addition, in order to ensure the operational reliability of the battery module 6, before the structural glue is applied, the upper surfaces of poles of the plurality of battery cells may be arranged in an aligned manner, and then connected by the structural glue. Due to dimensional tolerances between the cells, a plurality of battery cells may have bottoms unaligned. That is, after the battery module 6 is connected to the bottom plate 7, distances between cells and the bottom plate 7 are different. It is embodied in the module height measuring device 3 that dimensional differences between bottom surfaces of cells and the bottom surface of the enclosure (or the bottom surface of the end plate) may vary. Therefore, in a preferred embodiment, the module height measuring device 3 comprises an enclosure support platform 31 and a height measuring unit 32. The enclosure support platform 31 has a support plane, and the support plane is used to support the enclosure of the battery module 6, so that the height differences of the plurality of battery cells are measured based on the enclosure support platform. The height measuring unit 32 is used to measure distances from the bottom surfaces of cells to the enclosure support platform 31, that is, the height differences between the cells.

It may be known from the above description that in the apparatus provided by the present application, the glue application device 2 installed on the frame 1 is used to apply glue to the cells. The module height measuring device 3 enables to measure the height differences between the plurality of battery cells in the battery module 6 and outputs the measurement results to the glue amount control device 8. The glue amount control device 8 accordingly controls the amount of the glue applied during the process of glue application to individual cells by the glue application device 2 according to the height differences, thereby preventing insufficient glue or excessive glue when the plurality of battery cells are fitted with the bottom plate 7, and improving the overall quality of the battery module.

Specifically, the enclosure support platform 31 may have a flat plate structure made of a hard material such as metal. In addition, in order to reduce the difficulty of operation by the height measuring unit 32, the enclosure support platform 31 may be arranged as a ring structure, through which the enclosure of the battery module 6 may be supported, so that the battery module 6 rests on the enclosure support platform 31. The ring-shaped enclosure support platform 31 has a middle notch 311 which exposes the plurality of battery cells. A height measuring unit 32 may be arranged at the middle notch 311 to measure the dimensional differences between the cells and the enclosure support platform 31. The height measuring unit 32 may particularly be a distance meter or a distance measuring sensor and the like. In some embodiments, the module height measuring device 3 further comprises a mounting rack 36. Both the enclosure support platform 31 and the height measuring unit 32 may be connected to the mounting rack 36 by a connecting member, and are arranged correspondingly so that after the battery module 6 rests on the enclosure support platform 31, the height measuring unit 32 may be used to measure the distances from the plurality of battery cells in the battery module 6 to a top surface of the enclosure support platform 31 (or the bottom surface of the bottom plate). After the measurement process is completed, the module height measuring device 3 may transmit the measurement results to the glue amount control device 8. The glue amount control device 8 may flexibly design the demand amount of glue in areas corresponding to individual cells on the bottom plate 7 according to the above-mentioned measurement results. For example, if the distance between a cell and the enclosure support platform 31 is large, the demand amount of glue for the area on the bottom plate 7 corresponding to the cell is large. Conversely, if the distance between a cell and the enclosure support platform 31 is small, the demand amount of glue for the corresponding area on the bottom plate 7 is small. Specifically, the glue amount control device 8 may be connected to the module height measuring device 3 and the glue application device 2 respectively by means of wired or wireless transmission to perform signal transmission, so as to achieve the purpose of controlling the amount of glue.

Further, as shown in FIG. 2, an elastic height measuring probe may be used to measure the distance between the bottom surface of a cell and the enclosure support platform 31. Such distance measuring component has a simple structure, relatively high sensitivity and low cost. Accordingly, the module height measuring device 3 may be further provided therein with a digital-to-analog conversion unit 33 to convert the size value measured by the elastic height measuring probe into an electrical signal or another communication signal and output the signal to the glue amount control device 8. A plurality of the elastic height measuring probes may be arranged. A plurality of the elastic height measuring probes are arranged in one-to-one correspondence to the plurality of battery cells to measure distances from the bottom surfaces of the cells to the enclosure support platform 31. Specifically, the elastic height measuring probe may comprises a measuring head, an elastic member and a main body. The measuring head is flexibly connected to the main body through the elastic member. The measuring heads of the plurality of elastic height measuring probes are arranged in an aligned manner and all protruded out of an upper surface of the enclosure support platform 31. Those skilled in the art can flexibly change the distance by which the measuring heads protrude out of the enclosure support platform 31 according to the actual conditions, so as to ensure the accuracy of the measurement result. In some embodiments, the plurality of height measuring units 32 are evenly and linearly arranged, and the distances between the plurality of height measuring units 32 may be set as fixed values. The arrangement reduces the installation difficulty of the height measuring units 32 and may also improve the accuracy of the measurement result to a certain extent. In addition, the plurality of height measuring units 32 may all be arranged at middle positions of the enclosure support platform 31, that is, the plurality of height measuring units 32 are arranged in the center in the middle notch 311 along the arrangement direction of the cells. This prevents big deviation in distance from the both ends of the bottom surface of a cell to the enclosure support platforms 31 in case one cell tilts relative to other cells due to misoperation in bonding the cells. However, by measuring the middle position on the bottom surface of the cell, even if the cell tilts, the accuracy of the measurement result may not be affected, thereby preventing the tilt of the cell from adversely affecting the measurement result.

During the measurement process, the elastic height measuring probe applies an elastic force onto the battery module 6 along a vertical upward direction. In order to prevent the above-mentioned elastic force from affecting the accuracy of the measurement result, preferably, the module height measuring device 3 may also be provided with a pressing unit 34. The pressing unit 34 is installed on the enclosure support platform 31. In the process of measuring the battery module 6, the pressing unit 34 may apply a downward pressure onto the battery module 6 to prevent the accuracy of the measurement result from being affected by conditions such as warping or shaking of the battery module 6. Specifically, the pressing unit 34 may comprise a driving member 341 and a pressing head 342. The driving member 341 can be a driving cylinder and a hydraulic cylinder, etc. The driving member 341 may be fixed on the enclosure support platform 31. The pressing head 342 may be connected at a driving head of the driving member 341, so that when the battery module 6 is measured, the pressing unit 34 enables to apply a downward pressure onto the battery module 6. Optionally, the pressing head 342 may be fitted with the enclosure of the battery module 6 to prevent a battery module 6 not connected to the bottom plate 7 from loosening or even disintegrating. In some embodiments, a plurality of the pressing units 34 may be provided. Since the battery module 6 generally have a square shape, optionally, the enclosure support platform 31 may have a square ring structure. Accordingly, four pressing units 34 may be provided, and the four pressing units 34 may be respectively arranged at four corners of the enclosure support platform 31 to further enhance the pressing effect on the battery module 6.

Further, the module height measuring device 3 may be further provided therein with a limiting block 35. The specific structure of the limiting block 35 may be determined according to actual needs. The limiting block 35 may be installed on the enclosure support platform 31. The limiting block 35 is used to perform a limited fitting with the battery module 6 to prevent displacement of the battery module 6 during the measurement of the battery module 6. In some embodiments, a plurality of the limiting blocks 35 may be provided. The plurality of limiting blocks 35 are arranged around the middle notch 311 to comprehensively limit the position of the battery module 6. Optionally, the limiting block 35 may be connected to the enclosure support platform 31 by means of adjustable connection, so that the fixing position of the limiting block 35 may be adjusted according to the actual size of the battery module 6.

Further, the apparatus is further provided therein with a movable mount 4 and through the movable mount 4, the glue application device 2 may be installed on the frame 1. In this case, during the working process, the glue application device 2 may move under the action of the movable mount 4, which makes it possible to provide only one glue outlet on the glue application device 2. During the glue application process, after the glue application to a target area is completed, the glue application device 2 may move to the next target under the action of the movable mount 4, which simplifies the overall structural complexity of the apparatus. Optionally, the frame 1 may further be provided with a mechanism for positioning a component to be glued. The mechanism may be arranged below the glue application device 2, thereby reducing the difficulty of glue application and facilitating the rapid solidification of the glue.

In order to further improve the degree of automation of the apparatus, as shown in FIG. 3, the apparatus provided by the present application may further comprises a feeding manipulator 5. The feeding manipulator 5 may comprise a clamp 51 and a movable unit 52, which are connected to each other. The clamp 51 is used to clamp the battery module 6 and the bottom plate 7. During the assembly process of the battery module 6, the feeding manipulator 5 may first transfer the bottom plate 7 to the mechanism for positioning the component to be glued. Then, the glue application device 2 completes the glue application to this component to be glued under the control of the glue amount control device 8. Finally, the feeding manipulator 5 clamps the battery module 6 not having the bottom plate 7 and fixedly connects the battery module 6 to the bottom plate 7 to complete the assembly of the battery module 6.

The above described are merely preferred embodiments of the present application, and are not intended to limit the present application. Various changes and modifications to the application may be appreciated by those skilled in the art. Any modifications, equivalent substitution and improvement made within the spirit and scope of the present application should be included within the protection scope of the present application.

What is claimed is:

1. An apparatus for producing a battery module, comprising:
  a frame;
  a glue application device, installed on the frame;
  a module height measuring device, used for measuring height differences between a plurality of battery cells in the battery module, wherein the module height measuring device comprises:
    an enclosure support platform configured to support an enclosure of the battery module;
    a digital-to-analog conversion unit in communication with a glue amount control device; and
    multiple height measuring units having a plurality of elastic measuring probes that are connected to the digital-to-analog conversion unit and arranged to measure the height distances between bottom surfaces of the plurality of cells and the enclosure support platform;
  the glue amount control device, coupled to both the module height measuring device and the glue application device, and arranged to control an amount of glue applied by the glue application device to the plurality of battery cells respectively according to the height differences provided by the module height measuring device.

2. The apparatus according to claim 1, wherein the plurality of the height measuring units are evenly and linearly arranged.

3. The apparatus according to claim 1, wherein the plurality of the height measuring units are arranged at a middle position of the enclosure support platform to measure heights from middle portions of the bottoms of the cells to the enclosure support platform.

4. The apparatus according to claim 1, wherein the module height measuring device further comprises a plurality of pressing units installed on the enclosure support platform, and arranged to press the battery module downwards.

5. The apparatus according to claim 4, wherein the plurality of the pressing units are arranged around the height measuring units.

6. The apparatus according to claim 1, wherein the module height measuring device further comprises a limiting block installed on the enclosure support platform to be engaged and fitted with the battery module.

7. The apparatus according to claim 1, further comprising a movable mount, through which the glue application device is installed on the frame.

8. The apparatus according to claim 1, further comprising a feeding manipulator arranged on one side of the frame.

* * * * *